United States Patent [19]

Wickenheiser et al.

[11] Patent Number: 5,385,370
[45] Date of Patent: Jan. 31, 1995

[54] OCCUPANT RESTRAINT SYSTEM WITH IMPROVED MOUNTING MECHANISM

[75] Inventors: Francis J. Wickenheiser, Carleton; Timothy J. Sterling, Swartz Creek; Tom T. Ngo, Madison Heights, all of Mich.

[73] Assignee: Ford Motor Company, Dearborn, Mich.

[21] Appl. No.: 172,798

[22] Filed: Dec. 27, 1993

[51] Int. Cl.6 ............................................... B60R 21/16
[52] U.S. Cl. .................... 280/808; 297/483; 297/486
[58] Field of Search ............ 280/801.1, 808, 801.2; 297/483, 486

[56] References Cited

U.S. PATENT DOCUMENTS

| | | | |
|---|---|---|---|
| 3,147,995 | 9/1964 | Bohlin | 297/468 |
| 3,743,046 | 7/1973 | Rothschild | 280/802 |
| 3,845,524 | 11/1974 | Hull et al. | 24/573.1 |
| 3,857,581 | 12/1974 | Kaneko et al. | 280/802 |
| 4,201,401 | 5/1980 | Brynn | 280/808 |
| 4,341,359 | 7/1982 | Jahn | 280/808 |
| 4,607,864 | 8/1986 | Kouketsu et al. | 280/808 |
| 4,770,459 | 9/1988 | Nakaiwa et al. | 296/68.1 |
| 4,982,982 | 1/1991 | Nishimura | 280/808 |
| 5,020,856 | 6/1991 | George | 297/483 |
| 5,265,909 | 11/1993 | Verbeski | 280/808 |

Primary Examiner—Kenneth R. Rice
Attorney, Agent, or Firm—Daniel M. Stock; Roger L. May

[57] ABSTRACT

An improved occupant restraint system for an automotive vehicle of the type including multiple longitudinally spaced seating positions in which seats are arranged in back-to-back relationship includes a guide ring assembly having two D-rings mounted on a common bolt on a vertical body pillar that is in longitudinal registration with the backs of a pair of back-to-back seats.

16 Claims, 1 Drawing Sheet

OCCUPANT RESTRAINT SYSTEM WITH IMPROVED MOUNTING MECHANISM

BACKGROUND OF THE INVENTION

1. Technical Field

The invention relates generally to occupant restraint systems for automotive vehicles, and more particularly to restraint systems for automotive vehicles employing back-to-back seating arrangements.

2. Description of the Prior Art

It is legislatively mandated in certain jurisdictions that occupant restraint devices, typically combination lap and shoulder belt arrangements, be provided for each laterally outboard seating position in an automotive vehicle. For vehicles like station wagons, passenger vans, and sport/utility vehicles, which may have more than two longitudinally spaced seating positions, this mandate has resulted in the provision of occupant restraint systems which add significant weight and cost to the manufacture of such vehicles, and which may be mounted in ways viewed as aesthetically unpleasing.

In mounting a combination lap and shoulder belt for use by seated passengers in the outboard positions, it is typical to use a retractor mounted in the vehicle from which a seatbelt passes and which is anchored at its other end. Intermediate the retractor and the anchor is a guide ring, commonly referred to as a D-ring, which is positioned above the shoulder of the occupant so that a portion of the belt may be directed down and across the occupant for appropriate restraint. Mounting the D-ring to a fixed body portion of the automotive vehicle involves the use of reinforcing structure appropriate to carry the belt load since the load requirement at the mounting point of the D-ring is greater than the loading requirement for adjacent portions of the vehicle body. Adding this reinforcing structure at multiple positions adversely affects the overall weight of the vehicle as well as its cost.

Furthermore, in mounting the D-rings with respect to the vehicle seating positions, the frequent practice in the prior art has been to mount multiple D-rings at discrete longitudinal positions along the roof rail of the vehicle. This has resulted, in some vehicle applications, in the unsightly view of unused belts suspended to hang vertically across the side windows adjacent the vehicle seating positions.

SUMMARY OF THE INVENTION

Responsive to deficiencies in the related art and practice, it is an object of the present invention to provide an occupant restraint system for an automotive vehicle having multiple longitudinally displaced occupant seating positions which reduce the outlay in material and cost customarily used in such applications.

Such an occupant restraint system is provided for a vehicle of the type that includes a pair of seats carried in the vehicle in back-to-back relationship with the backs of the seats in longitudinal registration with a pillar of the vehicle and in which a pair of D-rings, one each for the front and the rear of the two seats, are mounted for pivotal movement on the vehicle pillar.

According to one aspect of the present invention, the mounting of the front and rear D-rings to the body pillar of the vehicle is effected through a single bolt upon which both of the D-rings are pivotally mounted.

BRIEF DESCRIPTION OF THE DRAWINGS

Other objects and features of the present invention will be apparent to those skilled in the automotive vehicle body arts upon reading the following description with reference to the accompanying drawing, in which.

DESCRIPTION OF THE PREFERRED EMBODIMENT

Figure 1:
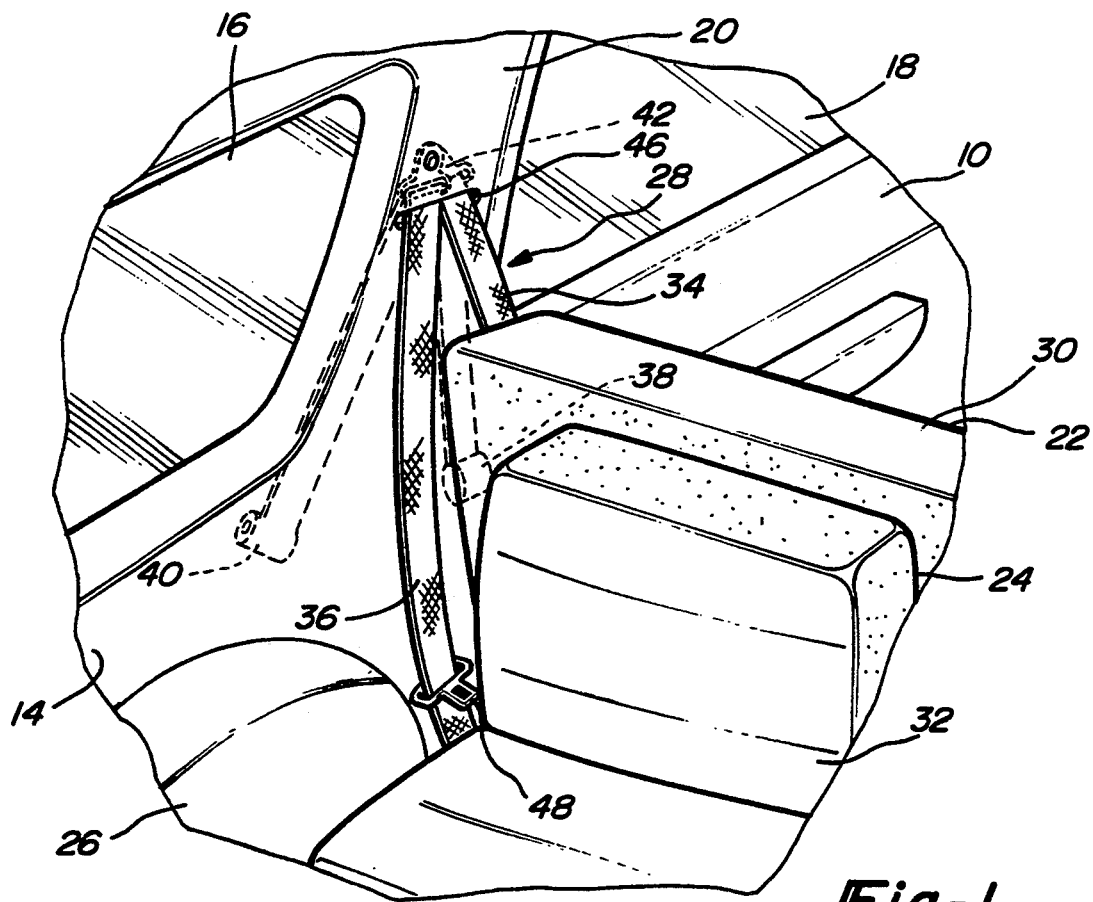
FIG. 1 is a partial perspective view of the interior of an automotive vehicle embodying the occupant restraint system of the present invention.

Turning now to the drawing, and in particular to FIG. 1 thereof, an automotive vehicle 10 is illustrated as having a passenger compartment 12 bounded on its sides by vehicle sidewalls 14 (one shown) through which are formed apertures for windows 16, 18, illustrated as being separated by a generally vertically extending body pillar 20 for support of the vehicle roof (not shown).

The vehicle 10 is illustrated as being of the type of vehicle employing a plurality of longitudinally spaced seating positions. Specifically, the vehicle 10, represented in FIG. 1, is a station wagon type vehicle which includes a front seat 22 and a rear seat 24 arranged in back-to-back relationship, the rear seat 24 being narrower than the front seat 22 to accommodate positioning within a rear wheel house portion 26 of vehicle 10. it is to be understood that the vehicle 10 illustrated is intended to represent a station wagon in which another seating position is provided forward of the seat 22.

Occupant seats 22, 24 are provided with an occupant restraint system, indicated generally at 28. It should be noted that the seat back 30 of the front seat 22 and the seat back 32 of the rear seat 24 are positioned in approximate longitudinal registration with the pillar 20. This convenient placement contributes to the appropriate configuration of the occupant restraint system 28.

The occupant restraint system 28 further includes a front seatbelt 34 and a rear seatbelt 36. Each of the seatbelts 34, 36 is arranged as a continual sloop seatbelt system in which a retractor 38, 40 is mounted in a known manner on the body of the vehicle 10 for controlling protraction and retraction of the belts 34, 36. The ends of each of the belts 34, 36 opposite the retractors 38, 40 are anchored to another portion of the vehicle body, typically the floor (not shown). Each belt 34, 36 is threaded through a guide assembly, indicated generally at 42, which is mounted on the pillar 20 and covered by a trim panel 44 having a slot 46 formed therein for passage of the belts 34, 36. A buckle tongue 48 (one shown) is carried on each of the belts 34, 36 for engagement with a buckle (not shown) carried on the inboard side of the seating position in each of the seats 22, 24.

Figure 2:
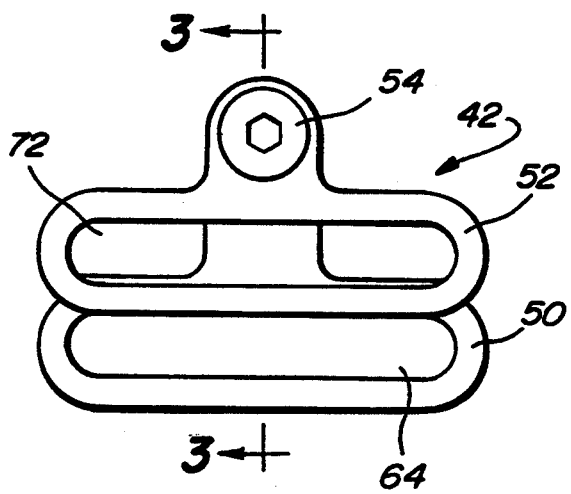
FIG. 2 is an elevational view of the improved D-ring assembly of the occupant restraint system of the present invention.

Because of the variation in longitudinal position of the occupant seating positions for the seats 22, 24, respectively, and because of the variation and seated height and girths of various vehicle occupants, it is important that relative noninterfering movement of the courses of the belts 34, 36, as they pass through the guide assembly 42, be provided. This is accomplished in the occupant restraint system of the present invention in part through provision of the illustrated guide ring assembly 42, which may best be seen in FIGS. 2 and 3.

The guide ring assembly 42 is illustrated as including a front D-ring 50, a rear D-ring 52, a mounting bolt 54, and an antifriction spacer 56. The front D-ring 50 is illustrated as comprising a flat plate having a mounting boss portion 58 pierced by a central bore 60 and a depending guide portion 62 having an elongated slot 64 formed therethrough for receiving the seatbelt 34. The rear D-ring 52 likewise is illustrated as including a mounting boss 66 through which is formed a throughbore 68 and a depending guide portion 70 through which is formed an elongated slot 72 for receiving the belt 36.

The mounting bolt 54 is illustrated as being of a stepped diameter design having a threaded portion 74 that extends axially to a first mounting diameter 76 terminating at a shoulder 78. It also has an enlarged mounting diameter 80, and finally includes a further enlarged head portion 82 in which driving surface, such as the hexagonal key aperture indicated at 84, is fabricated. In assembling the guide ring assembly 42 to the pillar 20, the mounting bolt 54 is inserted through the D-rings 50, 52 into threaded engagement with the reinforcing portion, which may be a threaded plate (not shown) carried in the vehicle body pillar 20. The first mounting diameter 76 supports the front D-ring 50 for pivotal movement with respect to the mounting bolt 54. The second enlarged mounting diameter 80 of the bolt 54 supports the rear D-ring 52 at its throughbore 68 for pivotal movement with respect to the mounting bolt 54 and hence the pillar 20. Also mounted on the enlarged diameter 80, is the antifriction spacer 56 which serves to separate the front D-ring 50 from the rear D-ring 52 to permit nonbinding passage of the belts 34, 36 through the slots 64, 72. The spacer 56 also may be configured to reduce the sliding contact area that might otherwise exist between the mounting bosses 58, 66 of the front and rear D-rings 50, 52, respectively. The elliptical cross-section shown in FIG. 3 is one such possible enhancement.

Figure 3:
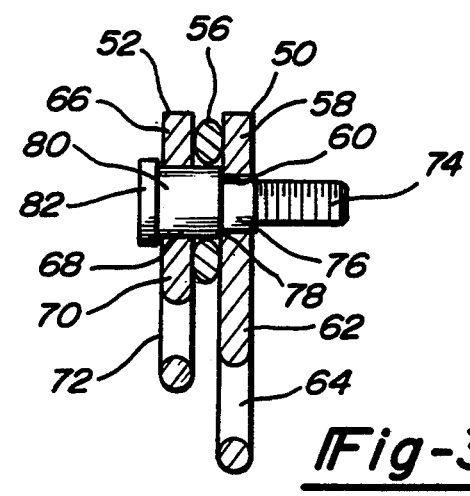
FIG. 3 is a cross-sectional view taken along line 3—3 of FIG. 2.

Nonbinding movement of the belts 34, 36 through the guide ring assembly 42 may also be facilitated by splaying apart the guide portions portions 62, and 70 of D-rings 50, 52, respectively, from the relative positions shown in FIG. 3 to provide further lateral separation between the slots 64 and 72.

While only one embodiment of the present invention of the present invention has been shown, others may occur to those skilled in the automotive vehicle body arts which do not depart from the scope of the following claims.

What is claimed is:

1. An occupant restraint system for an automotive vehicle, comprising:
    a vertically extending vehicle body pillar;
    a pair of longitudinally spaced seats carried in the vehicle in back-to-back relationship, a front seat facing forwardly and a rear seat facing rearwardly, the backs of the seats being positioned in longitudinal registration with the pillar;
    a front seatbelt;
    a rear seatbelt;
    a front retractor mounted on the vehicle adjacent the front seat and operative to control protractive and retractive movement of the front seatbelt;
    a rear retractor mounted on the vehicle and operative to control protractive and retractive movement of the rear seatbelt;
    a front D-ring having an elongated slot for guiding and receiving the front seatbelt from the front retractor and guiding the seatbelt toward the front seat;
    a rear D-ring having an elongated slot for guiding and receiving the rear seatbelt from the rear retractor and guiding the seatbelt toward the rear seat; and
    means for mounting both the front and rear D-rings on the vehicle body pillar for pivotal movement with respect thereto.

2. An occupant restraint system as defined in claim 1 wherein the mounting means is operative to permit pivotal movement about a single axis for both of the D-rings.

3. An occupant restraint system as defined in claim 1 wherein the mounting means comprises a single bolt fixedly secured to the pillar and pivotally supporting each of the D-rings.

4. An occupant restraint system as defined in claim 3 wherein the D-rings are carried in axially spaced relationship on the bolt.

5. An occupant restraint system as defined in claim 4 and further comprising antifriction means operatively disposed between the D-rings.

6. An occupant restraint system as defined in claim 5 wherein the antifriction means is a spacer member mounted on the bolt axially spaced between the D-rings.

7. An occupant restraint system as defined in claim 1 wherein the pillar includes an inner trim cover facing the seats and wherein the D-rings are carried between the trim cover and the pillar and the trim cover includes a slot for receiving the seatbelts.

8. An occupant restraint system as defined in claim 3 wherein the pillar includes an inner trim cover facing the seats and wherein the D-rings are carried between the trim cover and the pillar and the trim cover includes a slot for receiving the seatbelts.

9. An occupant restraint system for an automotive vehicle, comprising:
    a vertically extending vehicle body pillar;
    a pair of longitudinally spaced seats carried in the vehicle in back-to-back relationship, a front seat facing forwardly and a rear seat facing rearwardly, the backs of the seats being positioned in longitudinal registration with the pillar;
    a front seatbelt;
    a rear seatbelt;
    a front retractor mounted on the vehicle adjacent the front seat and operative to control protractive and retractive movement of the front seatbelt;
    a rear retractor mounted on the vehicle and operative to control protractive and retractive movement of the rear seatbelt;
    a front D-ring having an elongated slot for guiding and receiving the front seatbelt from the front retractor and guiding the seatbelt toward the front seat;
    a rear D-ring having an elongated slot for guiding and receiving the rear seatbelt from the rear retractor and guiding the rear seatbelt toward the rear seat; and
    a single bolt fixedly secured to the pillar and pivotally supporting both of the D-rings.

10. An occupant restraint system as defined in claim 9 wherein the bolt is a multiple shoulder bolt having a smaller diameter portion for pivotally mounting one of the D-rings and a larger diameter portion for mounting the other.

11. An occupant restraint system as defined in claim 10 wherein the one D-ring is the front D-ring, and the other D-ring is the rear D-ring.

12. An occupant restraint system as defined in claim 9 wherein the D-rings are carried in axially spaced relationship on the bolt.

13. An occupant restraint system as defined in claim 12, and further comprising antifriction means operatively disposed between the D-rings.

14. An occupant restraint system as defined in claim 13 wherein the antifriction means is a spacer member mounted on the bolt axially spaced between the D-rings.

15. An occupant restraint system as defined in claim 9 wherein the pillar includes an inner trim cover facing the seats and wherein the D-rings are carried between the trim cover and the pillar and the trim cover includes a slot for receiving the seatbelts.

16. An occupant restraint system as defined in claim 10 wherein the pillar includes an inner trim cover facing the seats and wherein the D-rings are carried between the-trim cover and the pillar and the trim cover includes a slot for receiving the seatbelts.

* * * * *